No. 884,487. PATENTED APR. 14, 1908.
S. A. HACKLEY.
FLY TRAP.
APPLICATION FILED AUG. 28, 1907.
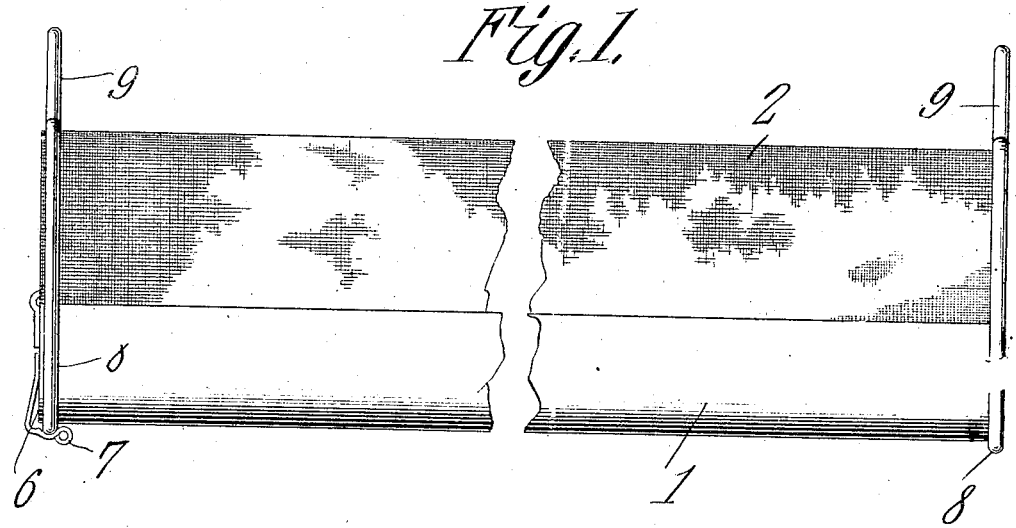
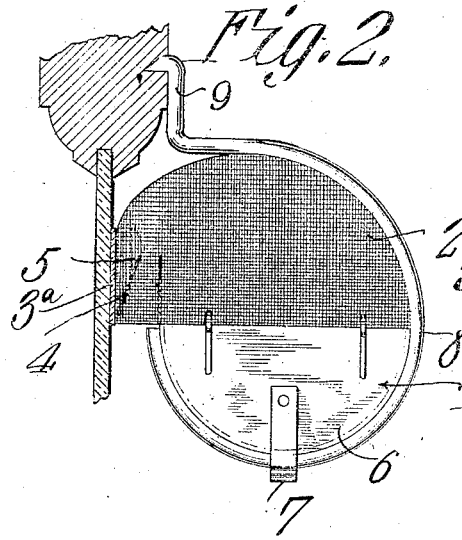
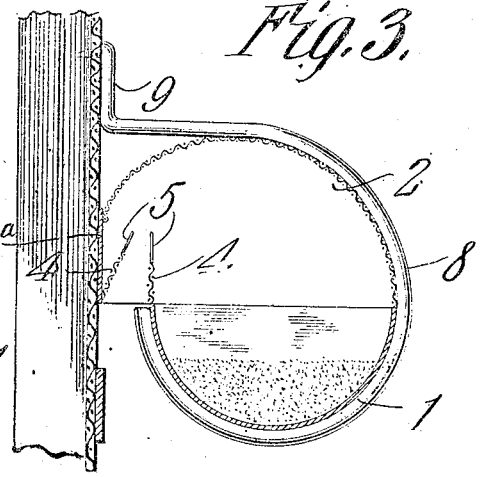
Witnesses
Inventor
Sumner A. Hackley
By
Attorneys

UNITED STATES PATENT OFFICE.

SUMNER A. HACKLEY, OF VICTOR, COLORADO.

FLY-TRAP.

No. 884,487.　　　Specification of Letters Patent.　　　Patented April 14, 1908.

Application filed August 28, 1907. Serial No. 390,529.

*To all whom it may concern:*

Be it known that I, SUMNER A. HACKLEY, a citizen of the United States, residing at Victor, in the county of Teller and State of Colorado, have invented a new and useful Fly-Trap, of which the following is a specification.

This invention has relation to fly traps adapted to be attached to screens, windows or other transparent objects and it consists in the novel construction and arrangement of its parts as hereinafter shown and described.

The object of the invention is to provide a trap in the form of an attachment, as indicated, which consists of a receptacle or body portion adapted to contain a poison or insecticide with a foraminous hood attached to the said receptacle and having a suitable inlet opening for the admission of the flies.

In the accompanying drawing:—Figure 1 is a side elevation of the trap. Fig. 2 is an end elevation of the same, and Fig. 3 is a transverse sectional view of the same.

The trap consists of the semi-cylindrical pan or receptacle 1 to the upper edges of which is attached a hood 2. The hood 2 is preferably made of fine-mesh screen wire but it may be formed from other foraminous material. The hood is substantially semi-cylindrical in formation but is of greater transverse dimensions than the receptacle 1, consequently one of the edges of the hood is spaced from the adjacent edge of the receptacle. The said hood is provided at its edge, which is spaced from the edge of the receptacle with an opaque plate 3$^a$ and the edge of the hood and the edge of the receptacle are provided with anticlinal foraminous strips 4, 4 which are bound at their free edges by the sheet metal strips 5, 5. The said foraminous strips 4 are disposed under the hood 2.

The receptacle 1 is provided at one end with a hinged door 6 having a spring clasp 7. Said receptacle is adapted to contain a poisonous powder or insecticide. The helical hangers 8 partly surround the hood and the receptacle and are provided with end portions 9 which are adapted to be attached to the frame of the door or window or other supporting object.

When in use the fly trap is attached to a glass or screen door or window at, or near the top or bottom thereof and the flies in an endeavor to get to the light will walk up the transparent portion of the supporting object and pass between the anticlinal strips 4—4 into the trap. The opaque plate 3 and strips 5 will shade the entrance sufficiently in order that flies, when once in the trap, will not have sufficient light in order to use the entrance as a means of exit.

The fly-trap, hereinabove described and illustrated in the drawing, has a curved or semi-cylindrical body and hood, but this form is optional, as it may be constructed of square, rectangular or any other polygonal shape desired without departing from the spirit of the invention.

Having described my invention what I claim as new and desire to secure by Letters-Patent is:—

1. A trap comprising a receptacle, a foraminous hood located over the same and having an edge spaced from an adjacent edge of the receptacle, an opaque plate attached to the hood at the said edge thereof which is spaced from the edge of the receptacle and anticlinal strips attached to the edges of the hood and the receptacle.

2. A trap comprising a substantially semi-cylindrical receptacle and a substantially semi-cylindrical hood, said hood having an edge spaced from the edge of the receptacle, anticlinal strips located at the spaced edges of the hood and the receptacle, and helical hangers embracing the hood and receptacle and having end portions for attachment to a fixed object.

In testimony that I claim the foregoing as my own, I have hereto affixed my signature in the presence of two witnesses.

SUMNER A. HACKLEY.

Witnesses:
　E. ANDERSON,
　B. F. ZIMMERMAN.